(No Model.)
S. H. HODGES.
TREE FOR BOOTS OR SHOES.
No. 333,630. Patented Jan. 5, 1886.
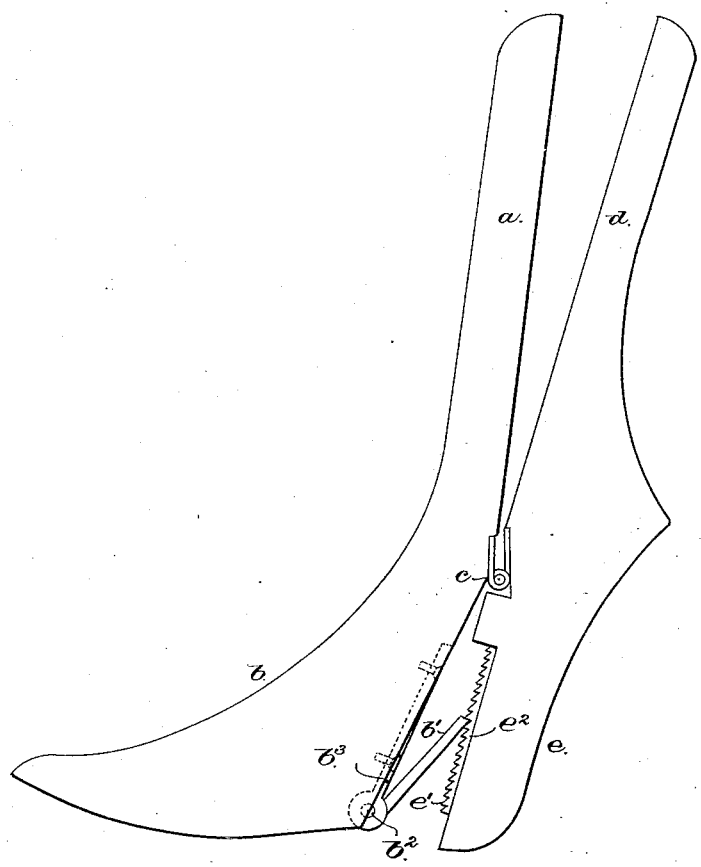
Witnesses.
T. W. Hobday
John F. C. Brinkert
Inventor.
Samuel H. Hodges.
by Crosby & Gregory attys.

UNITED STATES PATENT OFFICE.

SAMUEL H. HODGES, OF PARISH OF STREET, COUNTY OF SOMERSET, ENGLAND, ASSIGNOR OF ONE-THIRD TO GEORGE E. BARNARD, OF LYNN, MASSACHUSETTS.

TREE FOR BOOTS OR SHOES.

SPECIFICATION forming part of Letters Patent No. 333,630, dated January 5, 1886.

Application filed October 26, 1885. Serial No. 180,948. (No model.)

*To all whom it may concern:*

Be it known that I, SAMUEL HORATIO HODGES, residing in the Parish of Street, county of Somerset, England, have invented an Improvement in Trees for Boots and Shoes, of which the following description, in connection with the accompanying drawing, is a specification, like letters on the drawing representing like parts.

In the finishing of boots and shoes it is customary to insert therein a tree, which is made to stretch and hold the upper distended while the shoe is being blacked and otherwise prepared for market.

One class of tree which it has been customary to use is composed of a front piece having an attached foot-piece, the same cooperating with a back and heel piece, the back and heel piece being connected with a front piece by a hinge, the pressure to expand the tree being exerted by the hand of the operator embracing the front and back pieces.

My invention relates more especially to the class of tree referred to, and has for its object to provide the same with means whereby the tree may be automatically locked in its expanded conditon, so as to relieve the operator from the difficulty of holding the tree expanded, and so also that the tree may be left in the shoe and remain distended for any desired length of time.

My invention consists in a front piece having an attached foot-piece and a hinged back piece having an attached heel-piece, combined with a locking device to retain the parts of the tree in an expanded position.

The drawing, in side elevation, represents a tree embodying my invention.

The front piece, $a$, provided with a foot-piece, $b$, has connected to it, by the hinge-joint $c$, the back piece, $d$, provided with the heel-piece $e$.

The parts so far described are old and in common use, and when used the strain put upon the shoe by moving the heel-piece $e$ away from the foot-piece $b$ is effected by the hands of the operator embracing the front piece and the back piece, and the strain is continued only so long as the operator continues to grasp the said front piece and back piece.

With a tree such as referred to, in case the dressing material does not dry quickly, the operator has to hold the tree and wait for the completion of the drying process. To avoid this, and also to relieve the operator from the continued exertion of retaining the front piece and the back piece pressed toward each other and the shoe under strain, I have herein provided the heel-piece $e$ with a series of notches or projections, as at $e'$, the same being made, preferably, in a metal plate, $e^2$, secured to the heel-piece $e$ by means of suitable screws.

I have provided the foot-piece $b$ with a dog, $b'$, which is pivoted at $b^2$ to a metal plate, $b^3$, connected with the foot-piece by suitable screws. (Shown by dotted lines.)

In operation the shoe or boot is preferably placed upon the tree while the foot-piece $b$ is uppermost, and the shoe having been applied the tree is overturned, so as to stand as in the drawing. The operator then, by grasping the front piece and back piece in his hand and forcing the same closer together, causes the heel-piece $e$ to be moved away from the foot-piece, and during its movement the dog $b'$, acting by gravity, drops and engages the teeth connected to, or it might be forming part of, the heel-piece, holding the parts in a stretched position, in which condition they will remain until the tree is inverted and the front piece and back piece again subjected to pressure, when the dog will drop from the toothed surface, leaving the parts of the tree in such condition that the heel-piece is free to move toward the foot-piece, and thereafter the boot or shoe may be readily removed from the tree, or vice versa.

It is obvious that the toothed surface may be equally well applied to the foot-piece, and the dog be made movable upon a fulcrum carried by the heel-piece.

Although preferring to use a metal plate provided with notches to be engaged by the end of the dog, it is obvious that the dog might be pointed and directly engage the wood of the heel-piece; but such construction would be inferior, yet I should consider the same within the scope of my invention.

I claim—

1. The front piece having an attached foot-piece, and the hinged back piece provided with a heel-piece, combined with the dog to hold the heel-piece and foot-piece in their expanded or extended condition, substantially as described.

2. The front piece having an attached foot-piece, and the hinged back piece provided with a heel-piece, combined with the dog and the co-operating toothed surface to hold the heel-piece and foot-piece in their expanded or extended condition, substantially as described.

In testimony whereof I have signed my name to this specification in the presence of two subscribing witnesses.

SAMUEL H. HODGES.

Witnesses:
G. W. GREGORY,
B. J. NOYES.